United States Patent Office 3,385,897
Patented May 28, 1968

3,385,897
PROCESS FOR THE OXIDATION OF ALKYL-AROMATIC HYDROCARBONS
William Daniel Vanderwerff, West Chester, Pa., assignor to Sun Oil Company, Philadelphia, Pa., a corporation of New Jersey
No Drawing. Filed Nov. 22, 1966, Ser. No. 596,085
10 Claims. (Cl. 260—599)

ABSTRACT OF THE DISCLOSURE

This invention relates to a process for the oxidation of alkylaromatic hydrocarbons, particularly alkyl-polynuclear aromatic hydrocarbons, to intermediate oxidation products such as alcohols, aldehydes or ketones. It especially relates to a process for the preparation of polynuclear aromatic aldehydes via oxidation of the requisite hydrocarbon with a superheated, acidified, aqueous alkali-metal vanadate solution as the novel oxidizing agent.

---

Existing processes for the oxidation of alkyl-aromatic hydrocarbons are legion. Some even are characterized by their selectivity to produce either the intermediate aromatic alcohol or aldehyde (or ketone as determined by the structure of the alkyl substituent) or the corresponding carboxylic acid. While many of these processes are quite effective in certain respects, they allow for considerable improvement in respect to control of selectivity of the site of oxidative attack and/or degree of oxidation. They either attack more than one alkyl substituent, and/or also attack the aromatic nucleus and/or lack specificity in the degree of oxidation thereby providing reduced yield of the desired product as well as its contamination by isomeric, more (or less) highly oxidized and/or degraded materials. To be more specific, the important prior art techniques for the preparation of aromatic aldehydes together with significant deficiencies thereof known to those skilled in the art are as follows:

(1) Liquid or vapor-phase auto-oxidation.—These processes are of limited use for aromatic aldehydes other than benzaldehyde and some of its homologs due to oxidative attack on the aromatic nucleus (both processes), formation of phenolic inhibitors (liquid phase) and low volatility of products (vapor phase).

(2) Oxidation by manganese dioxide in sulfuric acid.—An effective process but commercially limited by a non-regenerable oxidant.

(3) Etard oxidation.—A useful oxidative technique limited to laboratory use by its hazardous nature and expensive oxidant (chromyl chloride).

(4) Oxidation of chloromethylaromatics.—This process is dependent upon preparation of the requisite chloromethyl compound either by direct chlorination or by chloromethylation, both of which are relatively expensive, afford undesirable by-products and in many instances are limited in ability to provide certain isomers.

(5) Sommelet reaction.—Utilizing an intermediate chloromethyl compound, this technique has the same limitations as the preceding oxidation process.

(6) Hydrolysis of dichloromethylaromatics.—This process utilizes an expensive chlorination which invariably yields a chlorine-contaminated product.

(7) Gattermann-Koch and related carbonylation techniques.—This process, while quite workable, employs corrosive and hazardous reactants such as carbon monoxide, hydrogen fluoride and boron trifluoride. Furthermore, it is limited in its ability to produce certain isomers by the inherent reactivity of the aromatic substrate.

The process herein described obviates or at least substantially ameliorates the important deficiencies of the prior art methods.

It is the primary object of this invention to provide a process for the oxidation of alkylaromatic hydrocarbons wherein a high degree of control of the site of oxidative attack and degree of oxidation is possible. One object of this invention is to provide an oxidation process which avoids the use of toxic or otherwise hazardous materials. Another object of this invention is to provide an oxidation process wherein a readily regenerable oxidizing agent is employed. It is a further object to provide a novel oxidation system for alkylaromatic hydrocarbons. It is still another object of this invention to provide a process for the preparation of polynuclear aromatic aldehydes. Other objects and advantages of the present invention will be apparent to those skilled in the art from the more detailed description which follows.

Brief summary of the invention

To the accomplishment of the foregoing and related ends, it has now been discovered that alkylaromatic hydrocarbons can be oxidized to aromatic aldehydes (or alcohols or ketones depending upon the nature of the alkyl substituent) by contacting said hydrocarbons with a heated, acidified, aqueous solution of an alkali-metal vanadate or ammonium vanadate.

Detailed description of the invention

The acidification of simple ortho-, meta- and pyrovanadates is known to lead to an extensive spectrum of isopolyvanadates, individual representative examples of which are difficult to isolate and characterize. These isopolyvanadates can also be prepared, though not as advantageously, by addition of strong base to a very dilute solution of vanadium pentoxide, which behaves as a strong polyvanadic acid. In addition, the presence of certain anions (either as their salts or the corresponding acids) can result in the formation of heteropolyvanadates. Thus the acidification of simple vanadate solutions can be controlled to provide a solution containing a narrow range of iso- and/or heteropolyvanadates.

An important fundamental aspect of this invention is the discovery that certain such polyvanadate solutions possess very specific oxidizing power and the establishment of the conditions whereby these solutions may be obtained to achieve controlled oxidations. As suggested above, not only the pH of the resulting acidified vanadate solution but also the nature of the acid employed is important for producing a polyvanadate solution with the desired oxidizing properties. As acids we have found sulfuric and phosphoric to be quite suitable, although other acids can by used or is even preferred in some cases. The pH of vanadate solutions useful in the application of this invention is typically within the range of 1.0 to 6.0 and preferably within the range of 1.5 to 2.5. The concentration of the acid employed is conveniently in the range of 50 to 100 percent in order to avoid undue dilution of the vanadate solution in obtaining the desired pH. Addition of phosphates, whose beneficial effect may be due to buffering action, has at any rate an appreciable influence on the yield. Sodium dihydrogen orthophosphate is an example of a suitable buffer. Also suitable are phosphates of organic amines as for example that obtained by adding pyridine to a vanadate solution which has been acidified with phosphoric acid. Other phosphates can be used and even be preferred in some cases.

Substrates to which this invention may be applied are benzene, naphthalene and polynuclear aromatic hydrocarbons possessing at least one oxidizable alkyl substituent. The oxidizable alkyl substituent is one which has at least one benzylic hydrogen atom; that is, at least one hydrogen atom on the carbon atom attached to the aromatic nucleus. The alkyl group need not be restricted in chain length but, as some degree of water-solubility is required, groups of 1 to 4 carbon atoms are preferred. As those skilled in the art will appreciate, the type of oxidation product obtained will be determined by the nature of the alkyl substituent. For example: methyl groups will yield aldehydes; normal alkyl groups, and branched alkyl groups having the branching on carbon atoms other than that attached to the aromatic nucleus, will yield ketones; and secondary alkyl groups will yield alcohols. Furthermore, and equally obvious to those skilled in the art, when their attention is directed to same if a single isomeric product is desired, alkylaromatic hydrocarbons possessing two or more similar substituents unsymmetrically distributed on the aromatic nucleus are not suitable. For example: 1,2,4-tri (n-propyl) benzene and 1,3-dimethylnaphthalene will yield mixtures of isomeric products. Examples of alkylaromatic hydrocarbons which are particularly suitable as substrates for this oxidation are: toluene; xylenes; ethylbenzene; cumene; n-propylbenzene; mesitylene; durene; sec-butylbenzene; diethylbenzenes; di-(sec-butyl) benzenes; and in general, all dialkyl and symmetrical tri- and tetra-alkylbenzenes having similar alkyl substituents. Other examples of suitable substrates are mono-, di- and polyalkylnaphthalenes, anthracenes and phenanthrenes; especially methylnaphthalenes; ethylnaphthalenes; isopropylnaphthalenes; sec-butylnaphthalenes; 1,4-dimethylnaphthene, 1,5-dimethylnaphthalenes; 1,8-dimethylnaphthalene; 2,3-dimethylnaphthalene; 2,6-dimethylnaphthalene (a preferred feed); 2,7-dimethylnaphthalene; 1,4-diethylnaphthalene; 2,6-diisopropylnaphthalene; 1,4,5,8-tetramethylnaphthalene; 9-methylanthracene; 9,10-dimethylanthracene; 4-isopropylphenanthrene and the like. Further examples of suitable alkylaromatic hydrocarbons will be obvious to those skilled in the art.

ciated that the invention is not limited to the specific conditions or details set forth in these examples, since the process is capable of many modifications and variations, such modifications and variations being aided, suggested, or indicated by the discussion of the process as found herein and the discussions of the trends of the effects of the various factors.

Examples

To 300 ml. of a 1-molar aqueous solution of $NaVO_3$ (0.30 mole) was added 120 ml. of 5-molar $H_3PO_4$ (0.60 mole) and 41.4 g. of $NaH_2PO_4 \cdot H_2O$ (0.30 mole); this solution had a pH of 2.0. This solution was charged to a one-liter, rocking autoclave with 15.6 g. of 2,6-dimethylnaphthalene (0.10 mole), heated to 275° C. and maintained at that temperature for four hours. The cooled reaction mixture was filtered, the solids and filtrate separately extracted with ether, the ether extracts combined, dried and stripped to yield 14.7 grams of a mixture of 58 percent unreacted 2,6-dimethylnaphthalene and 42 percent 6-methyl-2-naphthaldehyde (48 percent yield based on vanadate charged). The following tables describe other examples of the oxidation of 2,6-dimethylnaphthalene with various modifications of the oxidation system and conditions:

|  | Without buffer | | | | |
|---|---|---|---|---|---|
| 2,6-DMN (moles) | 0.10 | 0.10 | 0.10 | 0.10 | 0.10 |
| $NaVO_3$ (moles) | 0.20 | 0.30 | 0.30 | 0.30 | 0.30 |
| $H_2SO_4$ (moles) | 0.20 |  |  |  |  |
| $H_3PO_4$ (moles) |  | 0.60 | 0.60 | 0.60 | 0.60 |
| pH | 1.0 | 2.0 | 2.0 | 2.0 | 2.0 |
| Temperature (° C.) | 300 | 225 | 250 | 275 | 300 |
| Time (hours) | 4 | 4 | 4 | 4 | 4 |
| Total product (grams) | 14.1 | 14.5 | 15.0 | 14.9 | 14.6 |
| Aldehyde (grams) | 0.89 | 2.2 | 2.4 | 3.1 | 3.4 |
| Yield (percent) | 10.3 | 17.5 | 18.9 | 24.0 | 26.8 |

|  | Buffered | | | | | |
|---|---|---|---|---|---|---|
| 2,6-DMN (moles) | 0.10 | 0.10 | 0.10 | 0.10 | 0.10 | 0.10 |
| $NaVO_3$ (moles) | 0.30 | 0.30 | 0.30 | 0.30 | 0.30 | 0.30 |
| $H_3PO_4$ (moles) | 0.60 | 0.60 | 0.60 | 0.60 | 0.60 | 0.60 |
| $NaH_2PO_4$ (moles) | 0.15 | 0.30 | 0.60 |  |  |  |
| Pyridine (ml.) |  |  |  | 24 | 36 | 75 |
| pH | 2.0 | 2.0 | 2.0 | 1.6 | 2.0 | 3.2 |
| Temperature (° C.) | 275 | 275 | 275 | 275 | 275 | 275 |
| Time (hours) | 4 | 4 | 4 | 4 | 4 | 4 |
| Time product (grams) | 14.1 | 14.7 | 14.1 | 14.2 | 13.9 | 14.3 |
| Aldehyde (grams) | 2.3 | 6.2 | 3.0 | 4.1 | 4.1 | 3.1 |
| Yield (percent) | 17.8 | 48.7 | 23.7 | 32.0 | 32.2 | 24.2 |

Vanadates suitable to the application of this invention are sodium, potassium, ammonium, lithium and other sufficiently water-soluble ortho-, meta- and pyrovanadates; for example: sodium metavanadate, ammonium metavanadate, potassium orthovanadate and sodium pyrovanadate. The alkali-metal vanadate is usually and conveniently employed in about stoichiometric amount, though in some instances an excess of either the hydrocarbon or vanadate may be desirable. The following equation illustrates the stoichiometry in the case of a metavanadate and a methyl-substituted aromatic hydrocarbon:

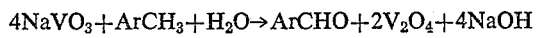

$$4NaVO_3 + ArCH_3 + H_2O \rightarrow ArCHO + 2V_2O_4 + 4NaOH$$

Another important reaction parameter is temperature. Suitable temperatures for the process will be found in the range of about 100° C. to 380° C., preferably from about 225° C. to 325° C. and most preferably from about 250° C. to 300° C. The oxidation is conveniently and effectively run under autogenous pressure, which closely approximates the vapor pressure of water, through higher pressures can be suitable or even preferable in some cases. Adequate agitation is also desirable because of the low solubility of hydrocarbons in the aqueous solutions employed, as those skilled in the art will readily appreciate.

To facilitate the understanding of the invention, certain details and illustrative embodiments will now be set forth; however, of course, it is to be fully understood and appre-

Having now described the invention, many ramifications and modified embodiments will readily occur to those skilled in the art. Insofar as such variations do not depart from the spirit and scope of the invention described in this application, they are intended to be embraced by the appended claims in their broadest construction.

What is claimed is:

1. A process of oxidizing alkyl aromatic compounds with an acidified aqueous solution of a vanadate compound selected from the group consisting of sodium vanadates, potassium vanadates, lithium vanadates, and ammonium vanadates at a temperature in the range of about 100° C. to 380° C. and under high pressure wherein the acid used to acidify said vanadate solution is selected from the group consisting of sulfuric and phosphoric acid.

2. A process according to claim 1 wherein the temperature is in the range of about 225° C.–325° C.

3. A process according to claim 2 wherein the pressure is substantially the autogenous vapor pressure of water at the reaction temperature.

4. A process according to claim 2 wherein the pH of the vanadate solution is in the range of about 1.5 to 2.5.

5. A process according to claim 4 wherein said solution is buffered.

6. A process according to claim 4 wherein said buffer is selected from the group consisting of pyridine and sodium dihydrogen orthophosphate.

7. A process according to claim 6 wherein the alkyl aromatic is an alkyl polynuclear aromatic hydrocarbon.

8. A process according to claim 6 wherein said alkyl aromatic compound contains at least one methyl group as the alkyl substituent and the product is an aromatic aldehyde.

9. A process according to claim 7 wherein said alkyl aromatic compound contains at least one methyl group as the alkyl substituent and the product is an aromatic aldehyde.

10. A process according to claim 9 wherein the alkyl polynuclear aromatic hydrocarbon is 2,6 dimethyl naphthalene, the vanadate is sodium vanadate, the acid is phosphoric acid, the buffer is sodium dihydrogen orthophosphate and the temperature is in the range of about 250° C. to 300° C.

References Cited

UNITED STATES PATENTS 1,302,273   4/1919   Appellbaum _____ 260—599

BERNARD HELFIN, *Primary Examiner.*